No. 843,266. PATENTED FEB. 5, 1907.
W. H. FREEDMAN.
SYNCHRONIZER.
APPLICATION FILED JUNE 13, 1903.
2 SHEETS—SHEET 1.
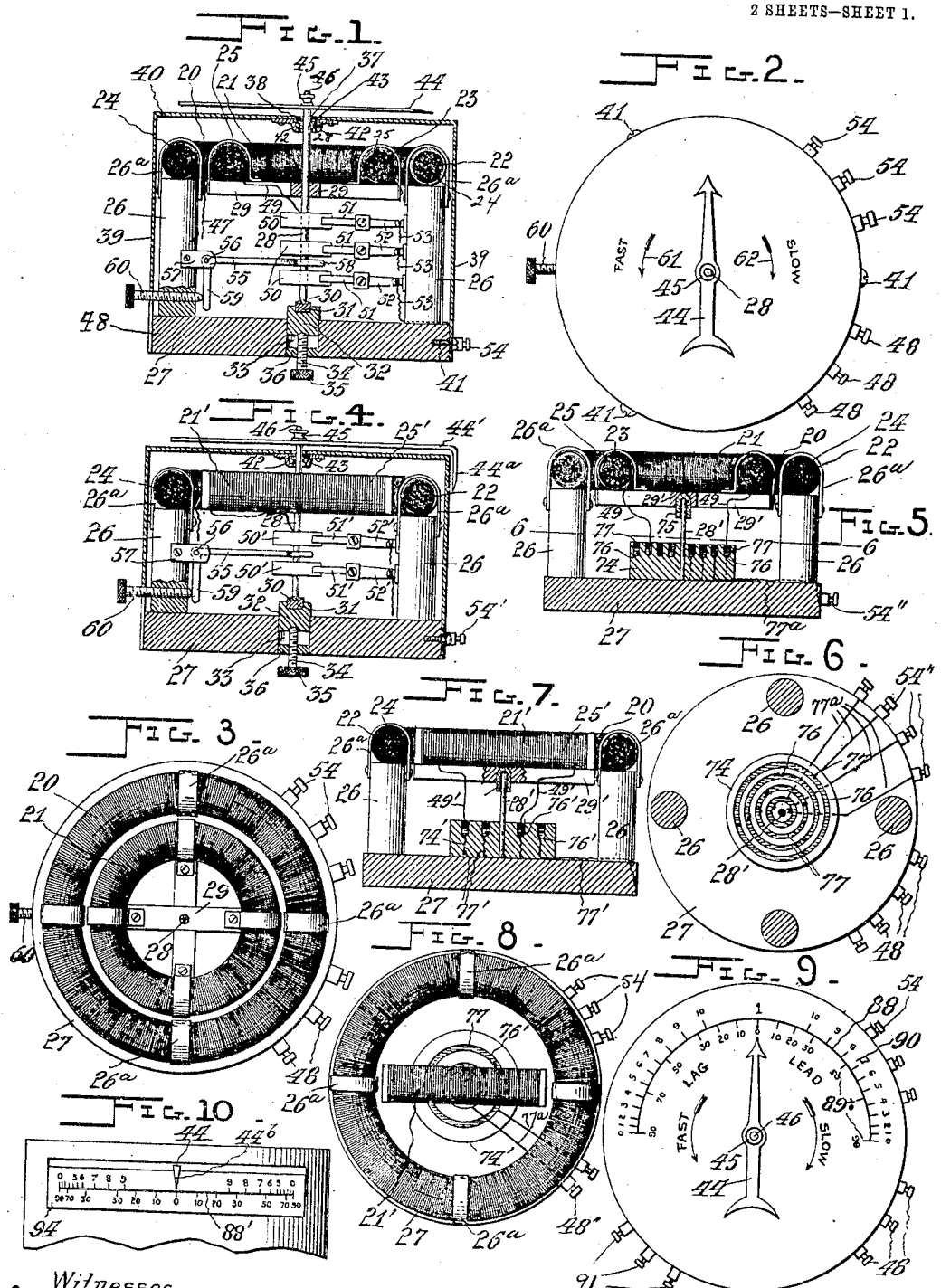
Witnesses
John F. Seufferwiel
George W. Colles
Inventor:
William H. Freedman
By
Edward P. Thompson Attorney.

No. 843,266. PATENTED FEB. 5, 1907.
W. H. FREEDMAN.
SYNCHRONIZER.
APPLICATION FILED JUNE 13, 1903.
2 SHEETS—SHEET 2.
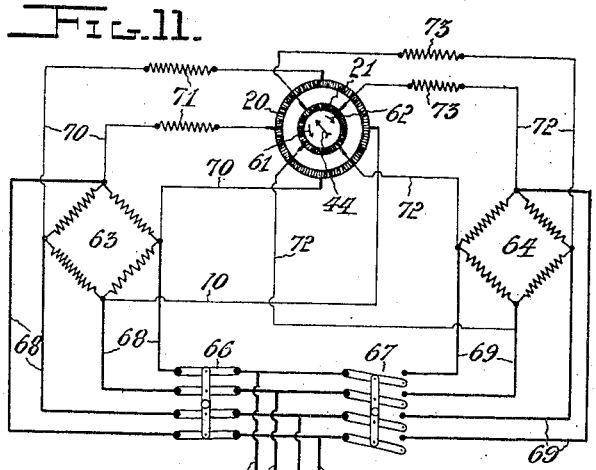
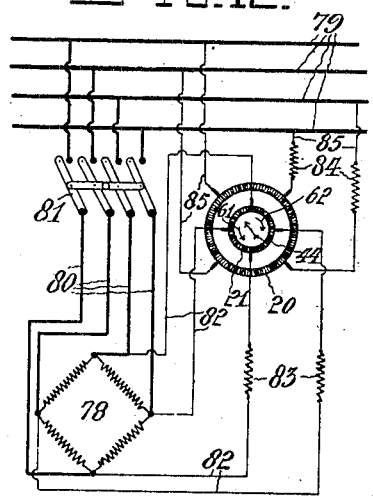
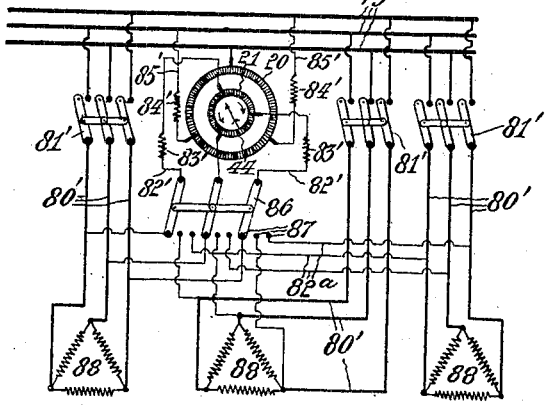
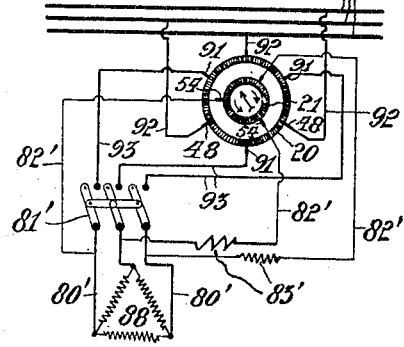
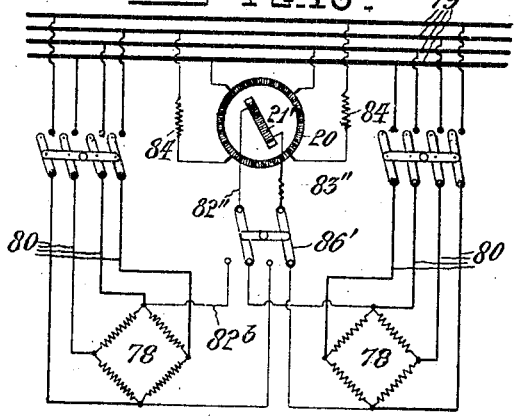
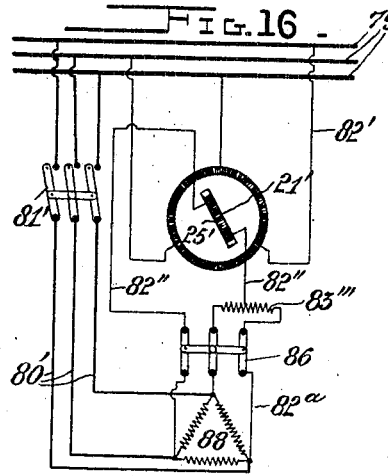
Witnesses.
Inventor:
William H. Freedman
By
Edward P. Thompson, Attorney.

UNITED STATES PATENT OFFICE.

WILLIAM H. FREEDMAN, OF BURLINGTON, VERMONT.

SYNCHRONIZER.

No. 843,266.  Specification of Letters Patent.  Patented Feb. 5, 1907.

Application filed June 13, 1903. Serial No. 161,279.

*To all whom it may concern:*

Be it known that I, WILLIAM HORATIO FREEDMAN, a citizen of the United States of America, and a resident of Burlington, in the county of Chittenden and State of Vermont, have invented certain new and useful Improvements in Synchronizers, of which the following is a specification.

My invention relates to an apparatus for synchronizing polyphase or single-phase circuits, my object being in particular to provide a synchronizing instrument by which two polyphase or single-phase generators may be quickly and readily brought into concordance before coupling them in parallel or by which any polyphase or single-phase generator may be brought into synchronism with the line-circuit before throwing it upon the line.

Another object of my invention is to provide the instrument with means whereby it may also be used as an instrument to indicate lag or lead of the current in any circuit and the power factor of that circuit—that is to say, to indicate, generally, the angle at which the current in the circuit lags behind or leads in advance of the pressure curve—and also the power factor itself, which is proportionate to the cosine of said angle.

My invention comprises in its elements, first, a rotating magnetic field, the part producing which is held stationary, and, secondly, a rotating or alternating field which is adapted to turn relatively to the first, or vice versa, these two members being connected up in pressure relation respectively to the two generators which are to be coupled in parallel or to the generator and the line-circuit, as the case may be, the arrangement being such that the movable member is stationary when the two generators are at the same frequency and at any other time the movable member rotates with respect to the stationary member at a greater or less speed in one direction or the other according as one of the generators is giving a frequency greater or less than that of the other.

My invention also comprises means for changing the connections of the instrument, whereby one of the members is connected in series with any generator and the other in parallel or pressure relation therewith, whereby in this case the movable member will take up a certain position with relation to the other at a varying angle, depending upon the lag or lead of the current in the generator-circuit and, further, in providing means, such as a pointer and scale, for determining such position, and hence the angle of lag or lead. In either case one of the members only need have a rotating field and the other need only have an alternating field of the same frequency, and either member may be made rotatable and the other stationary.

In the drawings accompanying this specification I have illustrated the several embodiments of my invention for two and three phase circuits, and herein—

Figure 1 is a vertical central section, and Fig. 2 is a plan, of a synchronizer adapted for use with a three-phase circuit. Fig. 3 is a plan view of the same with the cover removed. Fig. 4 is a central vertical section of a modified form of instrument adapted for two or three phase circuits. Fig. 5 is a central vertical section of another modified form. Fig. 6 is a section of the same on the line 6 6 of Fig. 5. Figs. 7 and 8 are respectively a central vertical section and a plan of a third form of instrument. Fig. 9 is a plan view of a combination synchronizer and phase-lag indicator. Fig. 10 shows a side elevation of a switchboard instrument adapted for side reading. Fig. 11 is a diagrammatic view showing the connections of a double-ring instrument for coupling two two-phase generators in parallel. Fig. 12 shows the arrangement for coupling a two-phase generator to a line-circuit. Fig. 13 is a diagram of connection for synchronizing any one of a series of three-phase generators with the line. Fig. 14 is a diagram of connections for a combined synchronizer and phase-lag indicator for a three - phase circuit or a combined synchronizer and power-factor indicator for a three-phase circuit. Fig. 15 shows the connections for synchronizing any one of a series of two-phase generators with a line, the synchronizer being of the form shown in Fig. 4. Fig. 16 is a similar diagram for a three-phase circuit.

In the instrument shown in Fig. 1, 20 and 21 represent two circular or ring coils, each comprising a core of iron wire 22 23 and insulated conductor-wire 24 25 wound thereover in the same manner as in the Gramme ring. These coils are shown one within the other and in the closest possible magnetic relation. It will be understood that the constructions may be varied by having individual poles on the iron core, if desired, or teeth, as in the Pacinotti ring, or in fact any other suitable arrangement may be adopted to bring the two elements into magnetic relation. The outer coil 20, as shown, is mounted on posts 26, which are placed upright on a base 27, the coil 20 being secured firmly in place by straps 26ª, and the whole may be inclosed in a suitable case 39 of cylindrical form with a closed end 40 and secured to the base by fastenings, such as screws 41. The inner coil 21 is fixed on an upright shaft 28 by means of cross-pieces 29. At the lower end of this shaft is formed a pivot 30, which rests on a hardened bearing, such as a jewel 31, supported in a block 32, which slides vertically in a socket 33, formed in the base, and is varied in position by means of a set-screw 34, having a milled head 35 and engaging with a fixed nut 36, secured to the base, by which arrangement the shaft 28, and hence the coil 21, may be adjusted in vertical position. The upper end of the shaft passes through a hole 37 in the center of the cover-plate 40 of the casing 39. Just below the cover 40 the shaft 28 is provided with a collar 38, and to the under side of the cover is secured a bearing-block 42, the two pieces 38 and 42 being formed with raceways to receive balls 43 and constituting a ball-bearing. The shaft 28 is readily slidable through the collar 38, so as to permit of ready dismounting of the apparatus. To the upper end of the shaft 28, which projects above the cover 40, is fixed an index finger or pointer 44 or any suitable means for ascertaining the movements of the shaft from the outside, this finger being removably attached by a thumb-nut 45, engaging with a threaded stud 46, formed on the end of the shaft 28.

Each of the coils 20 21 is divided into a number of aliquot ports depending on the number of phases of the circuit—as, for instance, into three parts for a three-phase circuit, four parts for a two-phase, and so on, and leads connected to the coils at these points. These leads 47 for the outer coil are electrically connected with a series of binding posts or terminals 48, while the leads 49 from the inner coil 21 are connected, as shown, to a series of collector-rings 50, these being in the instrument shown in Fig. 1 three in number, the instrument being for a three-phase circuit. Against the collector-rings 50 press brushes 51, which are supported in brackets 52, electrically connected by wires 53 to the binding posts or terminals 54. I also prefer to provide a brake for holding the inner coil in a stationary position, except when desired to indicate the synchronism of the circuit, this brake being in the form of an angular lever 55, pivoted at 56 in ears 57 to one of the posts 26, and whose horizontal limb is provided with a fork 58, taking under one of the collector-rings 50, and its other or vertical arm 59 projects downwardly and is engaged by the end of a set-screw 60. adjustable in the post 26, so that by screwing in the set-screw the fork 58 is raised until the weight of the shaft 28 is lifted partially or wholly off its bearing 31 and supported by the fork 58.

On the cover-plate 40 of the instrument (which may be inclosed, if desirable,) are shown two arrows 61 62, pointing in opposite directions and having, respectively, the legends "Fast" and "Slow" attached thereto, so as to indicate that the generator which is being synchronized is either fast or slow relatively to the line or to the other generator or circuit to which it is to be coupled.

Fig. 11 shows diagrammatically how this form of the instrument may be connected in order to synchronize two two-phase generators 63 64, it being understood, of course, that in this case there would be four terminals 48 and 54 and collector-rings 50 instead of three. At 65 is a line-circuit to which the generators are respectively connected by four-pole switches 66 67. The former, as shown, is closed to lead the current from the conductors 68 of the generator 63. The switch 67 is open and in like manner has connected thereto the conductors 69 of the generator 64. The outer coil 20 of the synchronizer is connected to the generator 63 in pressure relation by wires 70, in two of which may be interposed resistances 71 in the ordinary voltmeter fashion, while the inner coil 21 is similarly connected by pressure-wires 72 to the terminals of the generator 64 with interposed resistances 73.

Suppose now that the two generators are running in perfect synchronism. Each will produce a rotating magnetic field in its coil 20 or 21, and the two fields will rotate at the same speed. Hence there will be no relative rotation induced between the two coils, and the pointer 44 will remain stationary. If, however, the generator 64 running slower than the generator 63, the speed of rotation of the magnetic field in the coil 20 will be less than that in the coil 21, and hence the coil 20 will induce a forward (or clockwise) rotation of the coil 21, and hence the pointer 44 will rotate forwardly. If, however, the generator 64 be running faster than the generator 63, the speed of rotation of the magnetic field in the coil 21 will be greater than that in the coil 20, and in consequence a backward rotation will be induced in the coil 21, and the pointer 44 will rotate backwardly. Hence the direction of rotation of the pointer will indicate to the attendant in charge whether to speed up or slacken his machine to bring it into synchronism, and the machine will be thrown into parallel as soon as the pointer 44 stands stationary, or nearly so.

Before further describing the different ways of connecting the apparatus I will describe the modifications shown in Figs. 3 to 8, inclusive.

In Fig. 4 I have shown a modified form in which the inner ring or coil 21 is replaced by a straight diametral bar 21', as I have found it necessary only that one of the two inter-acting members should have actually a rotating field, while the other need only carry an alternating field. Hence Fig. 4 illustrates the substitution of an alternating field for the movable member, the bar 21' being in this case mounted on the shaft 28 and being simply wound with a coil of wire 25', the ends of which are led down to collector-rings 50' on the shaft 28, mounted in the same manner as the collector-rings 50 and from which the current is taken by means of brushes 51', supported in brackets 52', which are connected to the terminals 54'. The other arrangements of this instrument are identical with those in the form shown in Fig. 1, except that I have shown this instrument as provided with a modified form of pointer 44' for side reading, the end 44$^a$ of the pointer being carried beyond and bent over the edge of the cover, where, if desired, it may be read in connection with a scale or arrows on the cylindrical side of the cover instead of from the top.

Figs. 5 and 6 show another modified form of comparative simplicity, which I have used for experimental purposes. In this form the outer coil 20, the posts 26, the base 27, and the inner coil 21 are identical in form with those already shown; but herein the shaft 28 is replaced with a stationary pivot-post 28', fixed in a stationary base-block 74, mounted concentrically on the base 27 and having a pivot at its upper end received by a tubular step 75, of glass or other hard material, which is mounted at the juncture of the two cross-pieces 29', which support the coil 21. In the upper surface of the block 74 are formed concentric grooves 76, equal in number to the number of phase of the circuit and herein shown as four in number, for a four-wire two two-phase connection. In each of these grooves is contained a quantity of mercury 77, and into the mercury depend the wire leads 49 from the coil 21, so as to make electrical contact therewith, while the current is led to the grooves by leads 77$^a$, passing downwardly through the blocks 74 and outwardly on the base 27 to terminals 54''.

It will be seen that the structure is such that the inner coil 21 may freely rotate about its pivot while making continuous contact with the terminals of the circuit by means of the mercury-troughs 76.

In Figs. 7 and 8 is shown a third modification embodying the features shown by Figs. 5 and 6 in connection with a straight bar 21', the same as in Fig. 4. In this case the block 74 is replaced by a block 74', having only two grooves 76' therein, into which are led the terminals 49' of the coil 25', which is wound around the bar. This instrument operates in the same manner as the bar instrument, (shown in Fig. 4,) the two mercury-troughs being connected by leads 77' to a pair of terminals 48'', which are connected to the poles of an alternating circuit or to the combined poles of a polyphase circuit in a manner which will be presently pointed out.

In Fig. 12 is shown a diagram of connections of a double-ring instrument for synchronizing the two-phase or four-phase generator 78 with a line-circuit consisting of four bus bars or wires 79. The current-wires 80 of the generator are supposed to be connected to the several bus-bars 79 by a four-pole switch 81, and this is of course left open until the generator 78 arrives at the proper speed. Pressure-wires 82, having resistance 83 interposed in two of them, are led from the terminals of the generator to the terminals of one of the two rings, herein shown as of the inner ring or coil 21 of the synchronizer, while the terminals of the outer ring 20 are permanently connected through resistance 84 by pressure-wires 85 with the bus-bars 79, respectively. The synchronizer in this case operates in precisely the same manner as already described for Fig. 11, the synchronizer-pointer rotating in one direction or the other until the generator reaches the proper speed, when it comes to a stand, and the switch 81 is cut into circuit.

In Fig. 13 is shown the manner of connecting a series of three-phase generators with a single synchronizer so as to synchronize any of them with the line-circuit. In this figure the line-circuit or bus-bars are designated 79', and one of the two rings or coils of the synchronizer (herein shown as the outer) is connected with the bus-bars 79' by pressure-wires 85', which may contain resistances 84'. The terminals of the other coil 21 are likewise connected by pressure-wires 82', having interposed resistances 83', to the terminals of a three-pole change over-switch 86, whose free end may be alternately connected with the respective poles 87 of any one of the three-phase generators 88 in the station by means of pressure-wire connections 82$^a$. The current-mains 80' from these generators are connected with the bus-bars 79' by triple switches 81', as will be readily seen, and the generator which is to be coupled up with the line may be thrown into synchronism therewith by connecting the switch 86 with its pressure-wires 82$^a$.

Figs. 15 and 16 show the arrangements which may be adopted, respectively, for a four-phase and three-phase circuit, where the inner coil is replaced by a straight bar, as in Figs. 4 and 7. In Fig. 15 the outer coil or ring 20 is connected with the bus-bars 79 in the same manner as in Fig. 12. The four pressure-wires 82 are, however, replaced by two pressure-wires 82'' from the terminals of the bar 21', which are connected, through a resistance 83″, to a double-pole switch 86′, whose free end may be connected to a pair of opposite poles of either of the two generators by means of pressure-wires 82$^b$. It will be seen that while the line-circuit produces a rotary field in the ring 20 an alternating field only is produced in the bar 21′ by its connection with the generator 78; but this alternating field should be in phase with the rotating field before the generator is thrown into circuit. It is obvious that if the frequency of both the ring and the bar is the same the latter will set itself so that at the time its poles are of maximum strength they will be opposite points on the ring, where the poles are likewise of maximum strength; but if the frequency of the current in the bar is less than in the ring its maximum will occur somewhat later than at this point in the ring, and consequently on each rotation of the field in the ring it will pull the bar through a small angle, depending upon the amount of lag, and thus cause it to rotate continuously in the same direction in the same manner as where there are two rings. Of course in this case the ring 20 must be so wound and connected that its magnetic field shall present opposite poles at opposite extremities of a diameter.

Fig. 16 shows the connections of a similar form of synchronizer for a three-phase circuit. In this case the three-pole change-over switch 86 is still employed to connect the bar 21′ to the synchronizer, with the pressure-wires 82$^a$ from the generator 88; but one of the leads 82″ from the bar-coil is connected directly to one of the poles of the three-pole switch 86, while the other lead 82″ is connected in the center of a resistance 83‴, the two ends of which are connected to the other two poles of the switch, as shown. The resistance 83‴ should be double that of the coil 25′ on the bar, so that the actual connection of the three-pole switch 86 is identical with the ordinary form of star connection, whereas the coils in Fig. 13 and the outer coil in Fig. 16 are shown connected as in delta connection. Of course this is only one of the modes that may be adopted, which is shown by way of illustration.

In Fig. 9 is shown a combination synchronizer and lag-indicator or combination synchronizer and power-factor indicator and in Fig. 14 the manner of connecting the same. This instrument embodies the features of my improved lag-indicator or power-factor indicator, an application for which I have filed simultaneously herewith and which I do not claim separately in this application. This instrument is adapted to indicate either the relative phase of two circuits, the lag of the current in one of them, or the power factor, as may be desired. The instrument is identical with that already described, except that the pointer 44 is provided with a scale 88 of about one hundred and eighty degrees, on which are marked graduations 89 on the inner side, indicating the angle from the zero or central point of the scale, and on the outer side graduations 90, which are in proportion to the cosine of the angle and represent the power factor, the central point being numbered "1" on this scale. The scale must be so placed that the pointer shall come to rest at the zero or central point of the scale when the generator and line are in synchronism and phase and when the instrument is acting as a synchronizer, and the manner of the operation of this instrument will be exhibited from the connections shown in Fig. 14. In this diagram, which is shown for a three-phase circuit for convenience, the outer coil 20 is provided in addition to the terminals 48, which are connected with three points at distances of one hundred and twenty degrees on the ring, with three other terminals 91 at distances of sixty degrees from the terminals 48. The three terminals 48 are, as previously arranged, connected with the respective bus-bars 79′, but in this case by heavy leads 92, while the three terminals 91 are connected by heavy leads 93 with the mains 80$^8$ of the generator 88 through the three-pole switch 81′. The terminals 54 of the inner coil are connected by the pressure-leads 82′ with the respective poles of the generator, as previously. Now when it is desired to throw the generator into synchronism the switch 81′ is open, and in this case the two coils 20 and 21 are connected up in precisely the same manner as heretofore described for Fig. 13—that is to say, in voltage relation to the generator and line-circuit, respectively— so that the inner coil 21 will rotate continuously in one direction or the other until the two circuits are in phase. When this happens, the switch 81′ is cut in, and the instrument will now act as a lag-indicator, because the current through the mains 80′ will flow through the leads 93, through the coil 20 and the leads 92 to the bus-bars, while the inner coil will receive a rotating field, due to the voltage of the generator, in the same manner as before. While the frequency of the two circuits is the same, one of these circuits— in general, the current-circuit—will either lag behind or lead the other. Hence the pointer instead of coming to rest at the zero-point, as shown in Fig. 9, will come to rest at an angle at one side thereof, depending upon the angle of lag or lead of the circuit, and will thus indicate the angle of lag and power factor upon the scale. In this case it might be found necessary to wind the outer ring with two independent coils for current and pressure, respectively, as will be readily understood.

Fig. 10 shows a view of a side-reading instrument for switchboard use, in which the scale for indicating the lag and lead (designated 88') is formed on the electrical side of the instrument on a card which may be placed within a glass panel 94, the end of the pointer 44 being brought down, as at 44ᵇ, to this scale in the same manner as in Fig. 4, except that the pointer is within the cover of the instrument.

As will be readily understood, various modifications of my improved synchronizer and combined synchonizer and lag-indicator may be devised, those herein shown by me being merely by way of illustration of forms in which it may be embodied, and I desire it to be understood that my present invention embraces all such modifications and mechanical and electrical equivalents so far as they lie within the scope of the following claims.

Having thus described my invention, what I claim as new, and desire to secure by Letters Patent, is—

1. A synchronizer comprising a magnetic ring wound to produce a rotating field, a magnetic bar mounted in the plane of and concentrically with said ring and having also magnetic windings, and means for connecting said ring and bar respectively to the two currents to be synchronized.

2. A synchronizer comprising a magnetic ring having windings adapted to produce a rotating field and mounted in a horizontal plane, a revoluble magnetic member having magnetic windings and mounted to turn co-axially with said ring on a vertical spindle, and means for connecting the windings of said ring and member respectively with the currents to be synchronized, said means comprising in the case of the revoluble member annular mercury-cups into which the terminals of the windings of said member continuously dip thus permitting free rotation of said member.

3. A synchronizer comprising a base, an iron ring-core mounted thereon, a polyphase winding on said core, a concentrically-mounted rotatable shaft, a magnetic core concentrically mounted on said shaft and coacting with said ring, a winding covering said magnetic core, a collar on said shaft and through which said shaft is slidable, a bearing for said collar, means for electrically connecting the winding on said magnetic core in pressure relation with a current to be synchronized, and a brake acting on said shaft and operated from the side of the instrument.

4. A synchronizer comprising a stationary magnetic member having windings adapted to produce a varying field, a revoluble magnetic member also having windings and mounted in a horizontal plane, the windings of one of said members being adapted to produce a rotating field, a spindle on which said second member turns, and an adjustable step for said spindle enabling the raising or lowering of said second member with respect to the first.

5. A synchronizer comprising a stationary magnetic member having windings adapted to produce a varying field, a revoluble magnetic member also having windings and mounted in a horizontal plane, the windings of one of said members being adapted to produce a rotating field, a spindle on which said second member turns, and a lever-brake acting from beneath said second member and tending to raise the same from its bearing.

6. A synchronizer comprising a stationary magnetic member having windings adapted to produce a varying field, a revoluble magnetic member also having windings and mounted in a horizontal plane, the windings of one of said members being adapted to produce a rotating field, a spindle on which said second member turns, a brake-disk revolving with said second member, a lever-brake under said disk, and means for pressing said brake against said disk.

7. A synchronizer comprising a stationary magnetic member having windings adapted to produce a varying field, a revoluble magnetic member also having windings and mounted in a horizontal plane, the windings of one of said members being adapted to produce a rotating field, a spindle on which said second member turns, a brake-disk revolving with said second member, a lever-brake under said disk, and a laterally-projecting screw acting on said brake to press it against said disk.

8. A combination synchronizer and lag-indicator, comprising a stationary annular electromagnetic member having a winding of electric conductors, an alternating circuit connected in pressure relation to said member, a second electromagnetic member concentrically mounted to rotate adjacent to the first, a generator-circuit, pressure-wires connecting the poles of said generator-circuit with said second electromagnetic member, a pointer carried by said second member and rotating therewith, a scale mounted adjacent to said pointer and having the angle of lead and lag marked thereon, and means for changing the connection of said stationary member, whereby it is connected in current relation to said generator.

In testimony whereof I have hereunto subscribed my hand this 11th day of June, 1903.

WILLIAM H. FREEDMAN.

Witnesses:
F. W. WHITCOMB,
B. B. BALDWIN.